(12) United States Patent
Rozek

(10) Patent No.: US 9,590,502 B2
(45) Date of Patent: Mar. 7, 2017

(54) REGULATED SWITCHING CONVERTER

(71) Applicant: RF Micro Devices, Inc., Greensboro, NC (US)

(72) Inventor: Ashraf Rozek, Greensboro, NC (US)

(73) Assignee: Qorvo US, Inc., Greensboro, NC (US)

( * ) Notice: Subject to any disclaimer, the term of this patent is extended or adjusted under 35 U.S.C. 154(b) by 190 days.

(21) Appl. No.: 14/096,545

(22) Filed: Dec. 4, 2013

(65) Prior Publication Data

US 2014/0152284 A1 Jun. 5, 2014

Related U.S. Application Data

(60) Provisional application No. 61/733,201, filed on Dec. 4, 2012.

(51) Int. Cl.
*G05F 1/00* (2006.01)
*H02M 3/156* (2006.01)

(52) U.S. Cl.
CPC .................... *H02M 3/156* (2013.01)

(58) Field of Classification Search
CPC .... H02M 3/156; H02M 3/1563; H02M 3/157; H02M 3/158; H02M 3/06; H02M 3/07; H02M 2001/0045; H02M 2001/0025; H02M 2001/0009; H02M 2003/1566; H02M 1/32; H02M 1/322; H02M 1/34; H02M 1/342; H02M 1/344; H02M 1/346; H02M 1/348; G05F 1/56; G05F 1/565; G05F 1/569; G05F 1/573; G05F 1/575
USPC ........ 323/222–226, 271–278, 280, 282–288, 323/311, 312, 350–354, 315; 363/44–47, 363/56.12, 74, 123–127, 50; 330/109, 330/310, 311; 327/341, 344, 538, 327/551–559, 532; 361/111, 18
See application file for complete search history.

(56) References Cited

U.S. PATENT DOCUMENTS

| | | | |
|---|---|---|---|
| 5,617,306 A * | 4/1997 | Lai et al. ........................ | 363/17 |
| 6,946,821 B2 * | 9/2005 | Hamon .................. | G05F 1/565 323/273 |
| 7,759,912 B2 * | 7/2010 | Weng et al. .................. | 323/222 |
| 8,044,644 B2 * | 10/2011 | Huang ................ | H02M 3/1588 323/271 |
| 2006/0176098 A1* | 8/2006 | Chen et al. ................... | 327/341 |

(Continued)

*Primary Examiner* — Timothy J Dole
*Assistant Examiner* — Carlos Rivera-Perez
(74) *Attorney, Agent, or Firm* — Withrow & Terranova, P.L.L.C.

(57) ABSTRACT

A regulated switching converter having improved closed loop settling time is disclosed. An error amplifier having a voltage reference input, a feedback input, and an error output is included. An output filter having a voltage output terminal coupled to the feedback input provides an output voltage sample to the error amplifier. A compensation network coupled between the feedback input and the error output of the error amplifier includes at least one capacitor and at least one switch that is communicatively coupled across the at least one capacitor. A controller is adapted to monitor current flowing through the switching output terminal. The controller has at least one switch control output coupled to a control input of the at least one switch to allow the controller to momentarily close the at least one switch to substantially discharge the at least one capacitor when a predetermined high current state is reached.

14 Claims, 4 Drawing Sheets

(56) References Cited

U.S. PATENT DOCUMENTS

| | | | |
|---|---|---|---|
| 2011/0156688 A1* | 6/2011 | Lin et al. | 323/284 |
| 2011/0241632 A1* | 10/2011 | Yashiki | H02M 3/156 |
| | | | 323/268 |
| 2011/0285370 A1* | 11/2011 | Gritti | 323/282 |

* cited by examiner

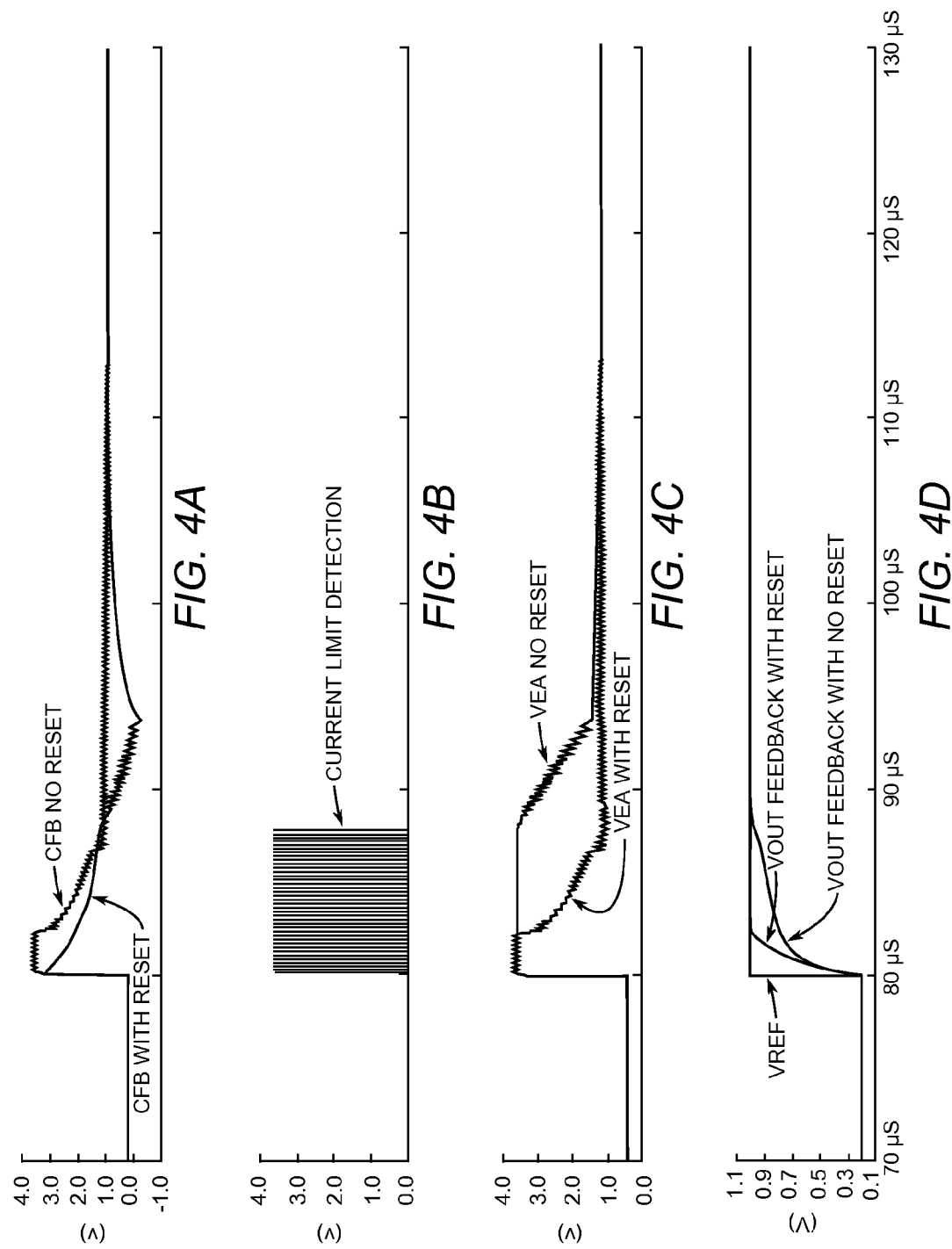

REGULATED SWITCHING CONVERTER

RELATED APPLICATIONS

This application claims the benefit of U.S. provisional patent application No. 61/733,201, filed Dec. 4, 2012, the disclosure of which is incorporated herein by reference in its entirety.

FIELD OF THE DISCLOSURE

The present disclosure relates to regulated switching converters and methods of operating regulated switching converters. In particular, the present disclosure relates to preventing output voltage overshoots.

BACKGROUND

Regulated switching converters having closed loop voltage regulation for controlling the switching of field effect transistors (FETs) can lose voltage regulation during fast reference voltage transitions. The loss of regulation can occur when transitions of the reference voltage occur faster than the bandwidth of a feedback loop that compares the output voltage of the regulated switching converter to the reference voltage. In such situations, an error amplifier used to compare the output voltage to the reference voltage can output an error amplifier output voltage that is highly inaccurate. As a result, a step response voltage of the reference voltage will often reach a supply voltage level, which will turn on at least one of the FETs. The FET that is turned on will inject a large amount of current into the output, which will likely lead to an overshoot voltage and loss of continuous voltage regulation. Even an addition of current limiting to the FETs will not prevent loss of voltage regulation due to a long settling time for a compensation network coupled between a feedback input and an error amplifier output voltage of the error amplifier. What is needed is a regulated switching converter having improved closed loop settling time.

SUMMARY

A regulated switching converter having improved closed loop settling time is disclosed. An error amplifier having a voltage reference input, a feedback input, and an error output is included. An output filter having a voltage output terminal coupled to the feedback input provides an output voltage sample to the error amplifier. A compensation network coupled between the feedback input and the error output of the error amplifier includes at least one capacitor and at least one switch that is communicatively coupled across the at least one capacitor. A controller is adapted to monitor current flowing through the switching output terminal. The controller has at least one switch control output coupled to a control input of the at least one switch to allow the controller to momentarily close the at least one switch to substantially discharge the at least one capacitor when a predetermined high current state is reached.

A benefit of the present regulated switching converter is realized during a reference voltage step response when the controller substantially discharges capacitors in the compensation network to allow for a relatively faster error voltage signal recovery. As a result of the faster error voltage recovery, a potential for an undesirably large current injection through the switching output terminal is eliminated and continuous voltage regulation is preserved.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 4A is a graph showing a comparison between feedback capacitor voltage without a compensation network reset and feedback capacitor voltage with a compensation network reset.

FIG. 4B is a graph of a step response waveform depicting current limit detection for the regulated switching converter of FIG. 1.

FIG. 4C is graph showing a comparison between error amplifier output voltage without a compensation network reset and error amplifier output voltage with a compensation network reset.

FIG. 4D is a graph showing comparisons between the reference voltage, output voltage of the regulated switching converter without a compensation network reset, and output voltage of the regulated switching converter with a compensation network reset.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
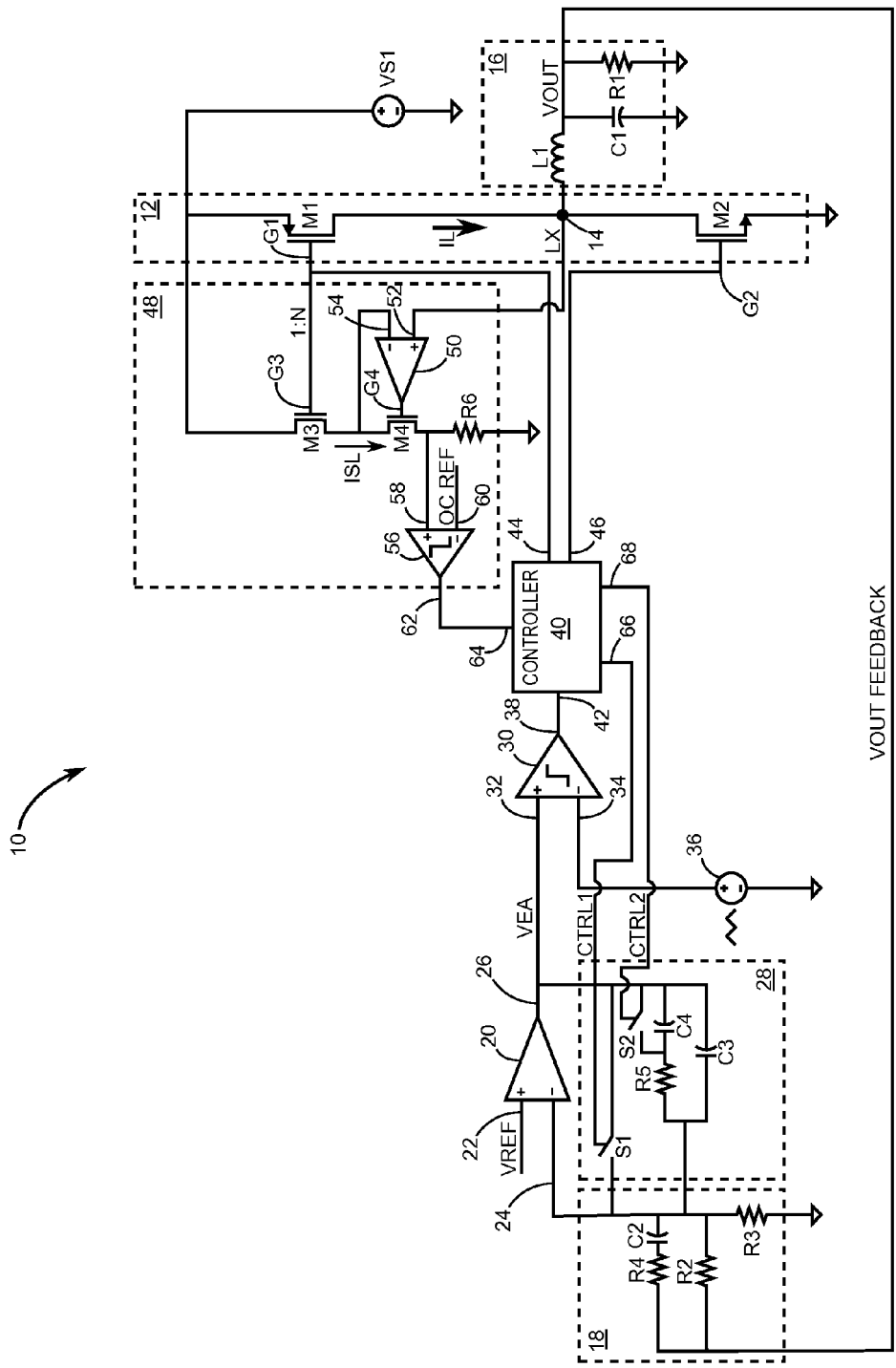
FIG. 1 is a schematic depicting a regulated switching converter having an improved closed loop settling time.

FIG. 1 is a schematic depicting a regulated switching converter 10 having an improved closed loop settling time in accordance with the present disclosure. In the exemplary embodiment of FIG. 1, the regulated switching converter 10 is a direct current to direct current (DC-DC) converter. However, it is to be understood that the teachings of the present disclosure apply to other types of regulated switching converters such as alternating current to direct current (AC-DC) converters.

The regulated switching converter 10 includes a power stage 12 made up of a positive type field effect transistor (PFET) switch M1 and a negative type field effect transistor (NFET) switch M2. A source of the PFET switch M1 is coupled to a voltage supply VS1 and a drain of the PFET switch M1 is coupled to a drain of the NFET switch M2 at a switching output terminal 14 conventionally known as the LX node. A source of the NFET switch M2 is coupled to ground.

An output filter 16 in the exemplary embodiment of FIG. 1 is an inductor-capacitor (LC) type filter. The output filter 16 is made up of an inductor L1, a capacitor C1, and a resistor R1. The inductor L1 is coupled between the switching output terminal 14 and a parallel coupling of the resistor R1 and the capacitor C1 to ground. The output filter 16 filters a pulsed voltage waveform output at the LX node during operation of the regulated switching converter 10. An output voltage VOUT is a filtered voltage developed across the capacitor C1 and the resistor R1 as a result of a filtering of the pulsed voltage waveform output at the LX node. The resistor R1 can be a load resistance. Inductance values for the inductor L1 range from around about 4.7 µH to around about 470 nH, with 470 nH being a typical inductance value. Capacitance values for the capacitor C1 range from around about 4.4 µF to around about 500 pF, with 4 µF being a typical capacitance value.

A feedback filter 18 receives a sample of the output voltage VOUT. In the exemplary embodiment shown in FIG. 1, the feedback filter 18 is made up of a resistor R2 and a resistor R3 that are coupled to form a voltage divider. A resistor R4 and a capacitor C2 are coupled in series to further filter the output voltage VOUT.

An error amplifier 20 has a non-inverting input 22 that receives a reference voltage VREF and an inverting input 24 that receives the further filtered sample of the output voltage VOUT. The error amplifier 20 further includes an error output 26 for providing an error amplifier output voltage VEA that is proportional to a difference between the reference voltage VREF and the output voltage VOUT.

A compensation network 28 is coupled between the error output 26 of the error amplifier 20 and the inverting input 24 of the error amplifier 20. The compensation network 28 depicted in the exemplary embodiment of FIG. 1 is made up of a compensation capacitor C3 coupled between the error output 26 and the inverting input 24. A compensation switch S1 is coupled across the compensation capacitor C3 for momentarily discharging the compensation capacitor C3. A compensation resistor R5 and a second compensation capacitor C4 are coupled in series between the error output 26 and the inverting input 24. A second compensation switch S2 is coupled across the second compensation capacitor C4 for momentarily discharging the second compensation capacitor C4.

A comparator 30 has a positive input 32 that is coupled to the error output 26 to receive the error amplifier output voltage VEA. The comparator 30 also has a negative input 34 that is coupled to a triangular waveform generator 36 that produces a triangular voltage waveform that is compared to the error amplifier output voltage VEA to generate a pulse width modulated (PWM) signal that is output from a comparator output 38.

A controller 40 receives the PWM signal from the comparator 30 through a PWM input 42 and in turn generates a first drive signal for the PFET M1 and a second drive signal for the NFET M2. The first drive signal is output from a PFET output 44 that is coupled to a gate G1 of the PFET M1. The second drive signal is output from an NFET output 46 that is coupled to a gate G2 of the NFET M2.

Current sensing circuitry 48 is adapted to sense a level of an inductor current IL flowing through the switching output terminal 14 is coupled between the power stage 12 and the controller 40. The current sensing circuitry 48 depicted in the exemplary embodiment shown in FIG. 1 is made up of a third FET M3 having a gate G3 coupled to the gate G1 of the PFET M1 and a source coupled to the voltage supply VS1. A fourth FET M4 has a source coupled to a drain of the third FET M3. A current sense resistor R6 is coupled between a drain of the fourth FET M4 and ground. A buffer amplifier 50 has an output coupled to a gate G4 of the fourth FET M4 and a non-inverting input 52 coupled to the switching output terminal 14. An inverting input 54 is coupled between the third FET M3 and the fourth FET M4. In this configuration, a sample current ISL flows through the resistor R6. The sample current ISL fractionally mirrors the current flowing through the switching output terminal 14. In one embodiment the sample current ISL can be scaled with a 1:N ratio, wherein N ranges between around about 100 and around about 1000. In another embodiment the sample current ISL can be scaled with a 1:N ratio, wherein N ranges between around about 1000 and around about 5000.

The current sensing circuitry 48 also includes a second comparator 56 having a positive input 58 coupled to a node between the fourth FET M4 and the current sense resistor R6. An over-current reference (OC REF) voltage is applied to a negative input of the second comparator 56. The OC REF voltage is predetermined such that an over-current event for the inductor current IL results in a logic signal indicative of the over-current event being generated at a current sense output 62 of the second comparator 56. The current sense output 62 is coupled to a current state input 64 of the controller 40. The controller 40 is adapted to generate a first compensation switch signal CTRL1 to momentarily close the compensation switch S1 of the compensation network 28 upon the controller 40 receiving an indication of an over-current event for the inductor current IL. The first compensation switch signal CTRL1 is transmitted from a switch control output 66 that is coupled to a control terminal of the compensation switch S1. The controller 40 is further adapted to generate a second compensation switch signal CTRL2 to momentarily close the second compensation switch S2 of the compensation network 28 upon the controller 40 receiving the indication of an over-current event for the inductor current IL. The second compensation switch signal CTRL2 is transmitted from a switch control output 68 that is coupled to a control terminal of the compensation switch S2. It is to be understood that the controller 40 can comprise combinational logic and sequential logic. Alternatively, the controller 40 can also be a microcontroller having firmware configured to monitor current flowing through the switching output terminal 14 and generate the first compensation switch signal CTRL1 to momentarily close the compensation switch S1 and generate the second compensation switch signal CTRL2 to momentarily close the second compensation switch S2 upon receiving an indication of an over-current event for the inductor current IL.

During operation negative feedback for the error amplifier 20 will not follow a fast VREF transition due to a relatively low bandwidth of the compensation network 28. As a result, the error amplifier output voltage VEA can reach a supply voltage level of the voltage supply VS1, which turns on the PFET M1 for a positive VREF transition. Once the PFET M1 is on, a predetermined over-current limit for the current may be reached. If a current limit is detected, the controller 40 will turn off the PFET M1 and turn on the NFET M2. Once the inverting input 24 of the error amplifier 20 settles to VREF, the error amplifier output voltage VEA slowly transitions to a steady-state. During this time the output voltage VOUT is trying to regulate, but the output voltage VOUT will overshoot its steady-state value and will have a relatively long settling time. In order to substantially reduce settling time, the controller 40 momentarily closes the compensation switch S1 and momentarily closes the second compensation switch S2 upon receiving an indication of an over-current event for the inductor current IL.

Figure 2:
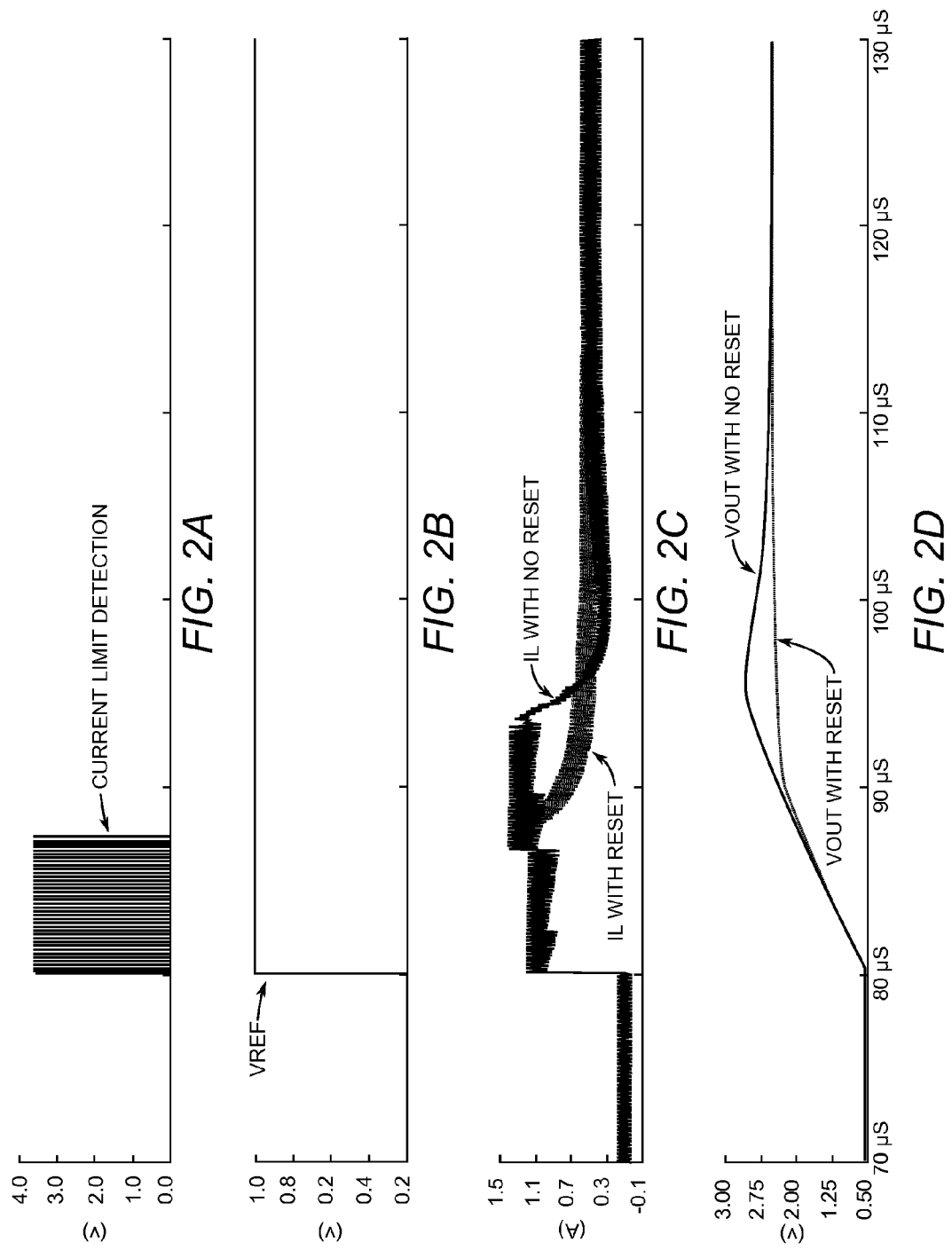
FIG. 2A is a graph of a waveform depicting current limit detection for the regulated switching converter of FIG. 1.
FIG. 2B is a graph of a reference voltage VREF used to set an output voltage level for the regulated switching converter.
FIG. 2C is a graph showing a comparison between an inductor current waveform with no compensation network reset and an inductor current waveform with a compensation network reset.
FIG. 2D is a graph showing a comparison between output voltage of the regulated switching converter without a compensation network reset and output voltage with a compensation network reset.

FIG. 2A is a graph of a waveform depicting current limit detection for the regulated switching converter 10 of FIG. 1 in response to a fast transition of the reference voltage VREF shown in FIG. 2B. FIG. 2C is a graph showing a comparison between an inductor current waveform with no compensation network reset and an inductor current waveform with a compensation network reset. Once the inductor current IL reaches an over-current limit, the controller 40 (FIG. 1) receives a logic signal indicative of the over-current event from the second comparator 56 (FIG. 1). In response, the controller 40 turns off the PFET M1 (FIG. 1) and turns on the NFET M2 (FIG. 1) in order to decrease the inductor current IL. The controller 40 also closes the compensation switch S1 and the second compensation switch S2 long enough to discharge the compensation capacitor C3 and the second compensation capacitor C4. As shown in FIG. 2D, the output voltage VOUT will not overshoot and the resulting settling time will be much faster than a relatively long settling time experienced without resetting the charge to near zero on the compensation capacitor C3 and the second compensation capacitor C4.

Figure 3:
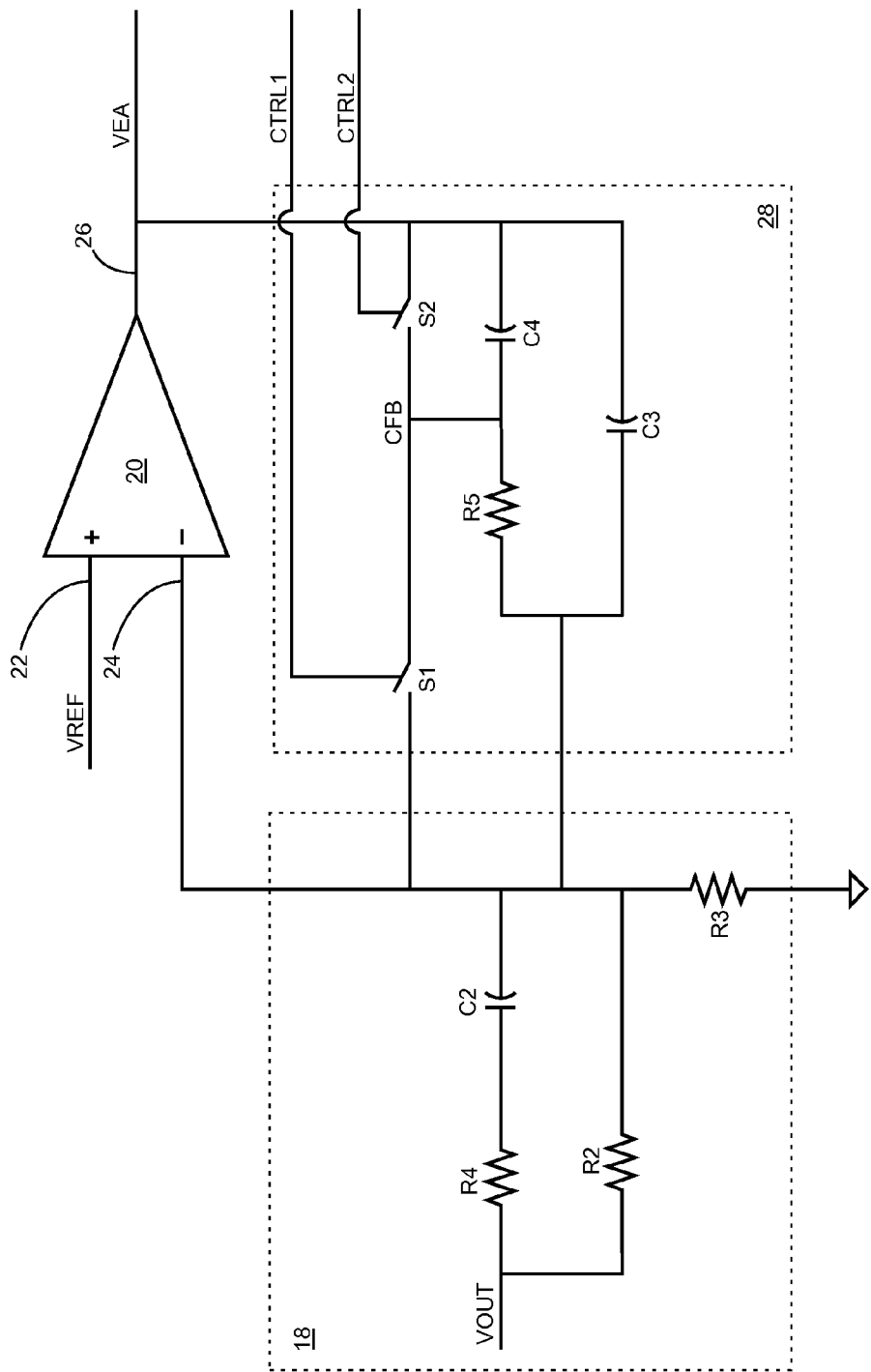
FIG. 3 is a schematic depicting an error amplifier and compensation network having an alternate switch combination.

FIG. 3 is a schematic depicting the error amplifier 20 and the compensation network 28 having an alternate switch combination for the compensation switch S1 and the second compensation switch S2. In this embodiment the compensation switch S1 and the second compensation switch S2 are coupled in series between the error output 26 of the error amplifier 20 and the inverting input 24 of the error amplifier 20. A compensation network node CFB between the compensation switch S1 and the second compensation switch S2 extends between the compensation resistor R5 and the second compensation capacitor C4. The advantage of this embodiment is that closing both the compensation switch S1 and the second compensation switch S2 simultaneously puts the error amplifier 20 in a unity gain configuration that allows the error amplifier output voltage VEA to recover faster than the compensation switch S1 and second compensation switch S2 arrangement of FIG. 1.

FIG. 4A is a graph showing a comparison between voltage at the compensation network node CFB (FIG. 3) without a compensation network reset and with a compensation network reset for the compensation switch S1 and second compensation switch S2 arrangement of FIG. 3. FIG. 4B is a graph of a step response waveform depicting current limit detection for the regulated switching converter 10 of FIG. 1. The graph depicted in FIG. 4B is practically unchanged from the graph depicted in FIG. 2A because the compensation switch S1 and second compensation switch S2 arrangement of FIG. 3 has little impact on the operation of current sensing circuitry 48. However, as shown in FIG. 4C and FIG. 4D, the recovery of both the error amplifier output voltage VEA and the output voltage VOUT is relatively faster with the compensation switch S1 and second compensation switch S2 arrangement of FIG. 3. In particular, the output voltage with reset as depicted in FIG. 4D is critically damped during a recovery from a reference voltage transition.

Those skilled in the art will recognize improvements and modifications to the embodiments of the present disclosure. All such improvements and modifications are considered within the scope of the concepts disclosed herein and the claims that follow.

What is claimed is:

1. A regulated switching converter comprising:
   a power stage coupled to a switching output terminal;
   an error amplifier having a voltage reference input, a feedback input, and an error output;
   an output filter having a voltage output terminal coupled to the feedback input of the error amplifier;
   a compensation network coupled between the feedback input and the error output of the error amplifier, the compensation network including a first switch communicatively coupled across a first capacitor and a second capacitor with a series resistor coupled in parallel with the first capacitor and a second switch coupled across the second capacitor; and
   a controller being adapted to monitor current flowing through the switching output terminal and having a first control output coupled to a control input of the first switch and a second control output coupled to a control input of the second switch for momentarily closing the first switch to substantially discharge the first capacitor and for simultaneously momentarily closing the second switch to substantially discharge the second capacitor when a predetermined high current state is reached and wherein the controller is configured to drive the power stage.

2. The regulated switching converter of claim 1 wherein the first switch and the second switch are coupled in series.

3. The regulated switching converter of claim 2 wherein the error amplifier has unity gain when the first switch and the second switch are both closed.

4. The regulated switching converter of claim 1 wherein the first switch is coupled in parallel with the first capacitor.

5. The regulated switching converter of claim 1 wherein an output voltage of the regulated switching converter is critically damped during recovery from a reference voltage transition.

6. The regulated switching converter of claim 1 further including current sensing circuitry that fractionally mirrors the current flowing through the switching output terminal.

7. The regulated switching converter of claim 6 wherein a fraction between a mirrored current and the current flowing through the switching output terminal is 1:N, where N ranges from around about 100 to around about 1000.

8. The regulated switching converter of claim 6 wherein a fraction between a mirrored current and the current flowing through the switching output terminal is 1:N, where N ranges from around about 1000 to around about 5000.

9. A method of controlling a regulated switching converter comprising:
   providing a compensation network having a first capacitor and a second capacitor coupled between a feedback input and an error output of an error amplifier;
   providing the second capacitor with a series resistor coupled in parallel with the first capacitor;
   providing a first switch coupled across the first capacitor;
   providing a second switch coupled across the second capacitor;
   providing a power stage having a first transistor coupled between a voltage source and a switching output terminal and a second transistor coupled between the switching output terminal and ground;

providing a controller configured to monitor current flowing through the switching output terminal and drive the power stage and having a first control output coupled to a first control input of the first switch and a second control output coupled to a second control input of the second switch;

monitoring current flowing through the switching output terminal by way of the controller to detect an over-current; and discharging both the first capacitor and the second capacitor by momentarily closing the first switch via a first control signal output through the first control output of the controller while simultaneously momentarily closing the second switch via a second control signal output through the second control output of the controller once the over-current is detected.

10. The method of controlling the regulated switching converter of claim 9 wherein the monitoring of current flowing through the switching output terminal is accomplished with current sensing circuitry coupled between the switching output terminal and a current state input of the controller.

11. The method of controlling the regulated switching converter of claim 10 wherein the current sensing circuitry fractionally mirrors the current flowing through the switching output terminal.

12. The method of controlling the regulated switching converter of claim 11 wherein a fraction between a mirrored current and the current flowing through the switching output terminal is 1:N, where N ranges from around about 100 to around about 1000.

13. The method of controlling the regulated switching converter of claim 11 wherein a fraction between a mirrored current and the current flowing through the switching output terminal is 1:N, where N ranges from around about 1000 to around about 5000.

14. The method of controlling the regulated switching converter of claim 9 wherein the first control signal and the second control signal are logic level signals.

* * * * *